(12) United States Patent
Jungbecker et al.

(10) Patent No.: US 9,145,121 B2
(45) Date of Patent: Sep. 29, 2015

(54) METHOD FOR MONITORING A BRAKE SYSTEM AND BRAKE SYSTEM

(75) Inventors: Johann Jungbecker, Badenheim (DE); Steffen Linkenbach, Eschborn (DE); Stefan A. Drumm, Saulheim (DE); Marco Besier, Bad Schwalbach (DE); Josko Kurbasa, Waldsolms (DE); Jochen Führer, Darmstadt (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 256 days.

(21) Appl. No.: 13/877,207

(22) PCT Filed: Oct. 5, 2011

(86) PCT No.: PCT/EP2011/067376
§ 371 (c)(1),
(2), (4) Date: May 10, 2013

(87) PCT Pub. No.: WO2012/049050
PCT Pub. Date: Apr. 19, 2012

(65) Prior Publication Data
US 2013/0218407 A1      Aug. 22, 2013

(30) Foreign Application Priority Data

Oct. 13, 2010 (DE) .......................... 10 2010 042 375
Aug. 19, 2011 (DE) .......................... 10 2011 081 240

(51) Int. Cl.
| | |
|---|---|
| B60T 17/22 | (2006.01) |
| B60T 13/12 | (2006.01) |
| B60T 7/04 | (2006.01) |
| B60T 8/40 | (2006.01) |
| B60T 8/88 | (2006.01) |
| B60T 13/66 | (2006.01) |

(52) U.S. Cl.
CPC .............. B60T 17/221 (2013.01); B60T 7/042 (2013.01); B60T 8/4081 (2013.01); B60T 8/885 (2013.01);

(Continued)

(58) Field of Classification Search
None
See application file for complete search history.

(56) References Cited

U.S. PATENT DOCUMENTS

| | | | | |
|---|---|---|---|---|
| 2003/0020327 A1* | 1/2003 | Isono et al. | ................ | 303/113.4 |
| 2005/0228546 A1* | 10/2005 | Naik et al. | ........................ | 701/1 |
| 2006/0131953 A1* | 6/2006 | Nakayama et al. | ........... | 303/122 |

FOREIGN PATENT DOCUMENTS

| | | |
|---|---|---|
| DE | 195 00 545 A1 | 7/1996 |
| DE | 101 41 547 A1 | 6/2002 |

(Continued)

OTHER PUBLICATIONS

PCT International Search Report—May 12, 2011.

(Continued)

*Primary Examiner* — John R Olszewski
*Assistant Examiner* — Nicholas K Wiltey
(74) *Attorney, Agent, or Firm* — Brinks Gilson & Lione

(57) ABSTRACT

A method for monitoring a brake system for motor vehicles. The system can be actuated both by a vehicle driver and independently of the vehicle driver in what is known as a brake-by-wire mode. The hydraulic actuation device can be actuated by means of a brake pedal and has a main brake cylinder to which wheel brakes are connected, at least two brake circuits, a simulation device, which comprises at least one elastic element and gives the vehicle driver a comfortable pedal feeling, an electrically controllable pressure-providing device, which is formed by a cylinder/piston assembly, the piston of which can be actuated by an electromagnetic actuator, wherein the first measurement variable ($P_{DBE}$) characterizing a position of the piston is detected. The detected measurement value of the first and second measurement variable ($S_{DBE}$, $P_{DBE}$) are compared to a predetermined characteristic map of the first and second measurement variables in order to monitor a functional status of the brake system.

13 Claims, 2 Drawing Sheets

(52) U.S. Cl.
CPC ............... *B60T 13/12* (2013.01); *B60T 13/662* (2013.01); *B60T 17/22* (2013.01); *B60T 2270/404* (2013.01); *B60T 2270/406* (2013.01); *B60T 2270/413* (2013.01)

(56) References Cited

FOREIGN PATENT DOCUMENTS

| DE | 102 33 196 A1 | 2/2003 |
|----|---|---|
| DE | 10 2007 001 526 A1 | 8/2007 |
| DE | 10 2010 003 082 A1 | 8/2011 |
| DE | 10 2010 003 084 A1 | 8/2011 |
| EP | WO 00/24618 | 5/2000 |
| EP | 1 671 863 A2 | 6/2006 |
| EP | 1 671 865 A1 | 6/2006 |
| EP | 1 950 112 A1 | 7/2008 |

OTHER PUBLICATIONS

German Examination Report—Mar. 15, 2012.

\* cited by examiner

METHOD FOR MONITORING A BRAKE SYSTEM AND BRAKE SYSTEM

CROSS-REFERENCE TO RELATED APPLICATIONS

This application claims priority to German Patent Application Nos. 10 2010 042 375.0, file Oct. 13, 2010, 10 2011 081 240.7, filed Aug. 19, 2011, and PCT/EP2011/067376, filed Oct. 5, 2011.

FIELD OF THE INVENTION

The invention relates to a method for monitoring a brake system and a brake system according to the preamble of Claim 10.

BACKGROUND OF THE INVENTION

"Brake-by-wire" brake systems are becoming ever more increasingly used in automotive technology. Such brake systems frequently comprise, besides a brake master cylinder operated by the vehicle driver, an electrically controllable pressure generating device, with which operation of the wheel brakes or the brake master cylinder occurs in the "brake-by-wire" operating mode. In order to provide a pleasant pedal feel for the vehicle driver in the "brake-by-wire" operating mode, the brake systems usually comprise a brake pedal feel simulation device. In such brake systems, the wheel brakes can also be operated without the active involvement of the vehicle driver by means of electronic signals which can be output e.g. by an electronic stability program (ESP) or a distance control system such as adaptive cruise control (ACC).

EP 1 950 112 A1 discloses a "brake-by-wire" brake system for motor vehicles having a brake-pedal-operated brake master cylinder, a pedal travel simulation device and a cylinder-piston assembly, whose piston can be operated by means of an electromechanical actuation device. The brake system comprises a pressure sensor for measuring the pressure generated by the cylinder-piston assembly and a pressure sensor for measuring the pressure generated by the brake master cylinder. In the application, no further details will be provided as to how the functioning of the brake system can be monitored.

The object of the present invention is to provide a method for monitoring a brake system and a corresponding brake system, which can detect a fault in the brake system with high reliability, e.g. a leak or air ingress.

This object is achieved according to the method and brake system in accordance with this invention.

INTRODUCTORY DESCRIPTION OF THE INVENTION

The invention is based on the idea of comparing the position of the piston of the pressure generating device and the resulting achieved pressure with specified values for monitoring the brake system, so as to enable a faulty state of the brake system to be detected. The characteristic field of the two variables specified for this purpose should reproduce the range of values to be expected for a faulty state of the brake system when taking into account manufacturing tolerances and/or measurement inaccuracies.

The invention is preferably embodied in a brake system in which each brake circuit or each wheel brake is connected to the brake-pedal-operated actuation device via a hydraulic connection, particularly preferably with a normally open isolating valve. Moreover, each brake circuit or each wheel brake is connected to the pressure generating device via a further hydraulic connection, particularly preferably having a normally closed connecting valve. A brake circuit or a wheel brake can thus alternatively be subjected to the pressure of the actuation device or the pressure of the pressure generating device.

Preferably, a brake system in accordance with this invention is a type in which the wheel brakes are subjected to pressure from the pressure generating device in a "brake-by-wire" operating mode and are subjected to pressure from the brake-pedal-operated actuation device in a fallback operating mode. For this purpose, particularly preferably, the isolating valves between the wheel brakes/brake circuits and the brake-pedal-operated actuation device are closed in the "brake-by-wire" operating mode and the connecting valves between the wheel brakes/brake circuits and the pressure generating device are opened. Accordingly, in the fallback operating mode, the isolating valves between the wheel brakes/brake circuits and the brake-pedal-operated actuation device are opened and the connecting valves between the wheel brakes/brake circuits and the pressure generating device are closed.

The method is preferably repeated and constantly carried out during the operation of the brake system, particularly preferably in the "brake-by-wire" operating mode. In the "brake-by-wire" operating mode, in which the pressure generating device is connected to the wheel brakes, the pressure generated by the pressure generating device represents the system pressure of the brake system.

According to a development of the method according to the invention, a plausibility check of the measurement values of the first and second measurement variables is carried out and only (successfully) plausibility-checked measurement values of the respective measurement variables are used for comparison with the characteristic field. Thus the correctness or quality of the measurement values of the first and second measurement variables cannot be questioned and in the event of a deviation of the actual measurement values from the permissible range of the characteristic field, a warning and/or an intervention in a vehicle control system or vehicle management means can be carried out directly.

An actual system stiffness is preferably determined from the measurement values of the first and second measurement variables as a derivative of the first measurement variable with respect to the second measurement variable or vice-versa. Said subsystem stiffness, which reproduces a system stiffness of a pressure generating device with wheel brakes, represents a measure of the level of functionality of the brake system and can e.g. be compared with threshold values.

According to a preferred embodiment of the invention, a third measurement variable characterizing the pressure of the brake master cylinder and a fourth measurement variable characterizing an operating travel of the brake pedal are detected and the detected measurement values of the third and the fourth measurement variables are compared with a specified characteristic field of third and fourth measurement variables for monitoring the functional state of the brake system. It is particularly advantageous if monitoring of the brake-pedal-operated actuation device is also carried out in the "brake-by-wire" operating mode in addition to the monitoring of the pressure generating device. It can thus be ensured that in the "brake-by-wire" operating mode, a leak in the brake-pedal-operated actuation device can be detected in a timely manner so that in the event of a changeover to the fallback operating mode, the remaining brake pedal travel is adequate for braking with sufficient deceleration.

A plausibility check is also preferably carried out for each of the measurement values of the third and fourth measurement variables, and only plausibility-checked measurement values of the respective measurement variables are compared with the characteristic field of third and fourth measurement variables. Very high reliability of fault detection is achieved by only using reliable signals/measurement values of the four measurement variables for monitoring the brake system, i.e. for the comparison with the two characteristic fields.

According to a preferred embodiment of the brake system according to the invention, the at least four sensor devices for detecting the four measurement variables are implemented in redundant form. Thus a plausibility check of the redundantly detected measurement values of a sensor device can be carried out. Alternatively it is preferred that a measurement variable is detected by two independent, e.g. not redundant, sensor devices. A plausibility-checked measurement value detection of a measurement variable can advantageously be carried out by an intrinsically safe sensor device.

According to a preferred embodiment of the method according to the invention, an actual system stiffness of the actuation device is determined from the measurement values of the third and fourth measurement variables as a derivative of the third measurement variable with respect to the fourth measurement variable or vice-versa. Said subsystem stiffness, which essentially represents a system stiffness of the brake master cylinder and the simulation device, represents a measure of the level of functionality and can e.g. be compared with threshold values.

According to a development of the method according to the invention, an overall system stiffness, whose value is monitored, is determined from the two subsystem stiffnesses. Thus the availability of the brake system in the fallback operating mode can be monitored. Particularly preferably, an error message is output if the overall stiffness is less than a specified limit value.

Preferably, an error message is output if the measurement values of the first and second measurement variables do not lie within a permissible area of the specified characteristic field of first and second measurement variables and/or if the measurement values of the third and fourth measurement variables do not lie within a permissible area of the specified characteristic field of the third and fourth measurement variables. Said error messages are advantageously subsystem-specific, in order to simplify later error correction in the workshop.

Preferably, a brake light switch is integrated in the actuation device of the brake system and its signal is particularly preferably used for monitoring and/or plausibility checking the brake system. Advantageously, the signal of the brake light switch is used in the event of a failure of the measurement variables characterizing the actuation travel of the brake pedal or of the corresponding sensor device.

BRIEF DESCRIPTION OF THE DRAWINGS

Other preferred embodiments of the invention emerge from the dependent claims and the following description using figures.

In the figures

ADDITIONAL DETAILED DESCRIPTION OF THE INVENTION

Figure 1:
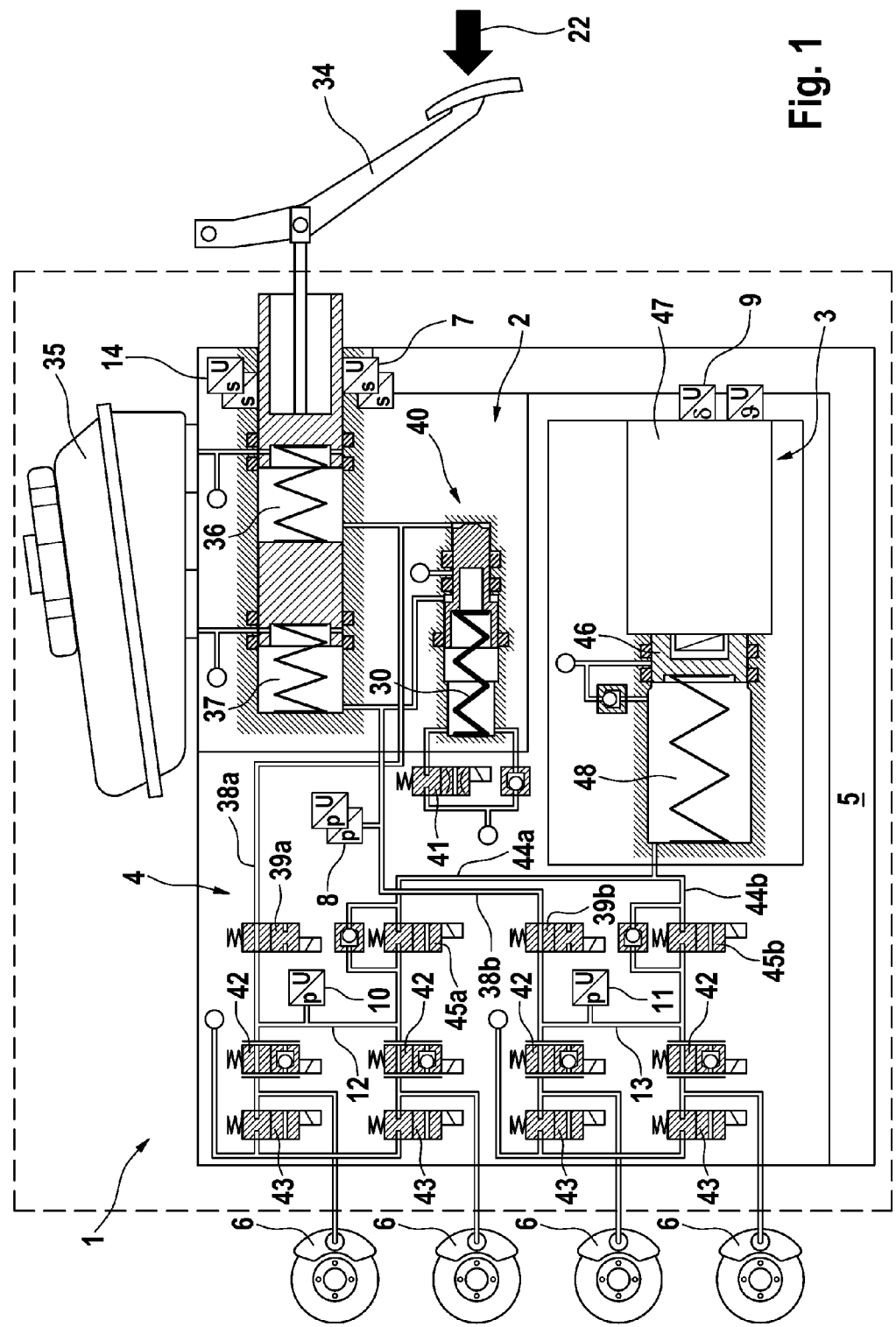
FIG. 1 shows a brake system according to the example.

In FIG. 1 a brake system according to the invention is schematically illustrated. System 1 comprises an actuation device 2, which can be operated by means of an operating pedal or a brake pedal 34 by a vehicle driver (driver's braking demand 22), an electromechanical actuation device, which represents an electrically controllable pressure generating device 3, a hydraulic wheel brake pressure modulation device 4 (HCU: hydraulic control unit), to whose output connections wheel brakes 6 are connected, and an electronic control and regulating unit 5 (ECU: electronic control unit), which is used for the control and/or checking of the components of the brake system.

Actuation device 2 comprises a dual circuit brake master cylinder or a tandem master cylinder with two hydraulic pistons arranged in series, which bound hydraulic chambers or pressure chambers 36, 37. The pressure chambers 36, 37 are connected to a pressure medium reservoir container 35 via radial bores formed in the piston, wherein these can be shut off by a relative movement of the piston in the housing of the brake master cylinder. Moreover, each pressure chamber 36, 37 is connected by means of a hydraulic line 38a, 38b to a brake circuit 12, 13 with two wheel brakes 6 in each case. An isolating valve 39a, 39b inserted into each of the hydraulic lines 38a, 38b is in the form of an electrically operable, preferably normally open, 2/2 way valve. A piston rod coupled to the brake pedal 34 acts together with the first master cylinder piston, wherein a variable $S_{Pedal}$ characterizing the actuating travel of the brake pedal 34 is detected by a displacement sensor 7 of preferably redundant design. A pressure sensor 8, preferably of redundant design, connected to the pressure chamber 37 according to the example detects the pressure $P_{Pedal}$ built up by the actuation device 2.

Actuation device 2 further comprises a simulation device 40, which interacts with the brake master cylinder and provides the vehicle driver with a comfortable pedal feel in the "brake-by-wire" operating mode. The simulation device 40 is preferably implemented in hydraulic form and consists essentially of a simulation device chamber, a simulation device spring chamber with a simulation device spring 30 and a simulation device piston separating said two chambers from each other. Here the simulation device chamber is connected to at least one pressure chamber 36, 37 of the brake master cylinder, while the simulation device spring chamber can be connected to the pressure medium reservoir container 35 with an electrically operated simulation device release valve 41 connected between them.

A pressure generating device 3 is in the form of a hydraulic cylinder-piston assembly, whose piston 46 can be operated by a schematically indicated electric motor 47 with a not illustrated rotation translation gearbox disposed between them. A sensor 9 of preferably redundant design is provided for detecting a variable $S_{DBE}$ characteristic of the position/location of the piston 46 of the pressure generating device 3, which according to the example is implemented as a rotor position sensor 9 for detecting the rotor position of the electric motor 47. A piston 46 bounds a pressure chamber 48, which can be connected to the brake circuits 12, 13 via hydraulic lines 44a, 44b by opening electrically operated connecting valves 45a, 45b. Here a non-return (check) valve that closes towards the pressure chamber 48 is connected in parallel with each of the connecting valves 45a, 45b.

For modulation of the pressure at the wheel brakes 6, the hydraulic pressure modulation device 4 preferably comprises an inlet valve and an outlet valve 42, 43 for each wheel brake 6. The input connections of the inlet valves 42 can be supplied with the pressure of the actuation device 2 (via lines 38a, 38b with isolating valves 39a, 39b) or the pressure of the pressure generating device 3 (via lines 44a, 44b with isolating valves 45a, 45b). The output connections of the outlet valves 43 are connected via return lines to the unpressurised pressure medium reservoir container 35.

Figure 2:
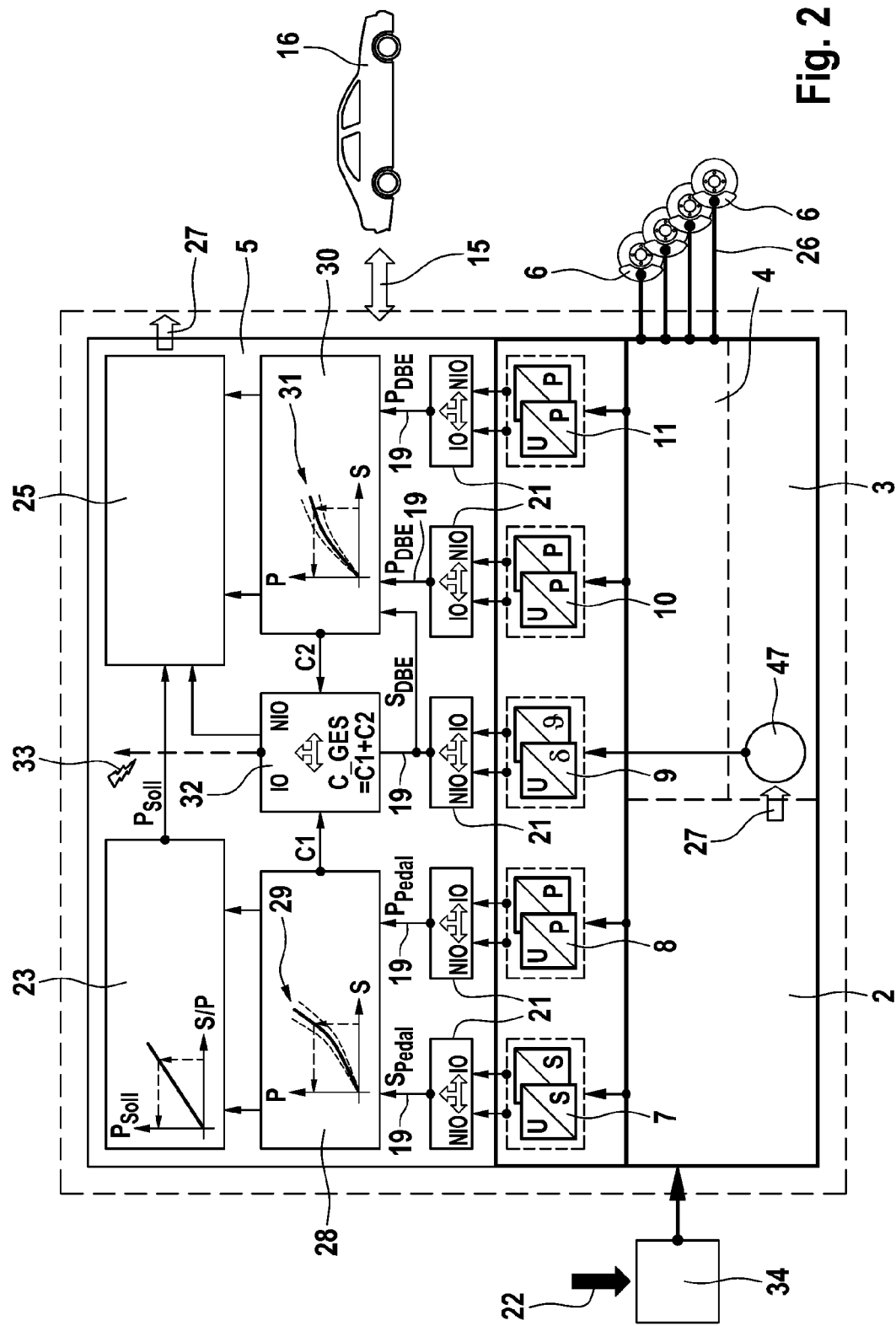
FIG. 2 shows a schematic illustration for demonstration of an example embodiment of a method according to the invention.

According to the example, a (not intrinsically safe or non-redundant) pressure sensor 10, 11 for detecting the pressure occurring at the input connections of the associated inlet valves 42 is disposed in each brake circuit 12, 13. Alternatively, an intrinsically safe or redundant pressure sensor can also be disposed in only one of the two brake circuits 12, 13. In both cases the pressure $P_{DBE}$ generated by the electrically controllable pressure generating device 3 in the brake circuits 12, 13 is advantageously available as a plausibility-checked pressure signal in the "brake-by-wire" operating mode: in one case by comparing the two signals of the two independent pressure sensors 10, 11 at different measurement locations and in the other case by using the signal of the redundant or intrinsically safe pressure sensor in only one of the brake circuits 12, 13. Of course it is still possible to dispose an intrinsically safe or redundant pressure sensor 10, 11 in each brake circuit 12, 13, as also illustrated in FIG. 2 in schematic form.

According to the example, the brake system comprises a brake light switch 14, which is preferably implemented as a physically separate sensor integrated in the actuation device 2. The signal of the brake light switch 14 can then be used in the event of failure of the displacement sensor 7, and thus increase the availability of the normal brake function ("brake-by-wire" operating mode).

Normal brake function means the generation of the pressure increase for the brake system demanded by the driver by means of the pressure generating device 3.

In its normal brake function, the brake system of FIG. 1 represents an external force brake system. Because the vehicle driver in said "brake-by-wire" operating mode is isolated from the brake circuits 12, 13 by the closed isolating valves 39a, 39b and the brake circuits 12, 13 are connected by means of the connecting valves 45a, 45b to the pressure generating device, the vehicle driver is no longer a subjective monitoring element and decision maker for the functional state of the brake system (e.g. poor bleed state, possible system leaks etc.). It would thus be desirable with a view to the safety of the vehicle and its occupants if a highly objective indication regarding the functioning of the brake system can be achieved using the sensor system of the brake system. For this purpose high requirements are to be placed on the reliability and availability of the signal generation of the sensor system. In order to check the brake system for possible system faults (such as leaks, unintended air ingress etc.), e.g. the various measurement variables are plausibility checked and monitored in a different manner in the electronic control and regulating unit 5. If defined warning thresholds are exceeded, categorized warning messages are sent from the control and regulating unit 5 to the vehicle 16 (e.g. via a vehicle interface 15) and/or to the driver. According to the classification (hazard potential) of the fault, intervention in the safety configuration of the vehicle 16 (vehicle architecture) can be made via the vehicle interface 15 (e.g. engine management, optical/acoustic/haptic warning messages, continuing only in workshop mode etc.). An aim consists here of the highest possible availability and maintaining the normal brake function of the brake system (i.e. operation in a fallback operating mode should be avoided if possible, especially if only a single fault occurs in the brake system).

A schematic picture for illustrating an example embodiment of a method according to the invention for monitoring a brake system is illustrated in FIG. 2. A driver's braking demand 22 applied by the driver by means of the brake pedal 34 is detected by means of two (different) measurement variables of the actuation device 2, e.g. the pressure $P_{Pedal}$ of the brake master cylinder determined by means of the redundant pressure sensor 8 and the actuating travel $S_{Pedal}$ of the brake pedal 34 determined by means of the redundant displacement sensor 7. For the pressure generating device 3 with an electric motor 47, two measurement variables are likewise detected, e.g. the pressure $P_{DBE}$ of the pressure generating device determined by means of the redundant pressure sensor 10 and the rotor position of the electric motor 47 determined by means of the redundant position sensor 9, which represents a measure of the position or location $S_{DBE}$ of the piston 46 of the pressure generating device 3. According to the example illustrated in FIG. 2, a second redundant pressure sensor 11 for determining the pressure $P_{DBE}$ is also available. Pressure sensor 11 is optionally available as described above.

In order to achieve monitoring of the brake system with high reliability, plausibility-checked measurement values of the measurement variables $P_{pedal}$, $S_{Pedal}$, $P_{DBE}$, $S_{DBE}$ (i.e. permissible or valid signals) are used for the monitoring, i.e. the quality of the provided signals need not be questioned. If there is a measurement value for $P_{pedal}$, $S_{Pedal}$, $P_{DBE}$, or $S_{DBE}$ then this is valid and represents the variable to be measured $P_{pedal}$, $S_{Pedal}$, $P_{DBE}$, or $S_{DBE}$ within a permissible measurement uncertainty. If a measurement value cannot be plausibility checked (e.g. because of a mechanical or electrical sensor defect), then no measurement value is forwarded.

As illustrated in FIG. 2, the measurement variables $P_{pedal}$, $S_{pedal}$, $P_{DBE}$, $S_{DBE}$ are each detected according to the example in a redundant manner and the two detected signals are compared in a sensor plausibility checking block 21. If both signals are within a defined tolerance band then a plausibility-checked measurement value 19 for the corresponding measurement variables $P_{pedal}$, $S_{pedal}$, $P_{DBE}$, $S_{DBE}$ is output. The plausibility check 21 of the signals is carried out according to the example in the control and regulating unit 5.

Alternatively it is also possible (not shown), that a sensor, e.g. the rotor position sensor 9, is implemented in intrinsically safe form, i.e. if the sensor outputs a signal it is treated as a valid measurement value. A plausibility check 21 in the control and regulating unit 5 is then omitted for said sensor.

As already mentioned, it is also possible (not shown in FIG. 2), that a measurement variable, e.g. the pressure $P_{DBE}$ of the pressure generating device, is determined at two different points by means of two non-redundant sensors (as illustrated in FIG. 1 for the pressure sensors 10, 11). The two detected signals can then be plausibility checked by comparison in a sensor plausibility checking block 21, so that again there is a plausibility-checked measurement value 19 for the measurement variable.

For monitoring the functional state of the brake system, especially the pressure generating device 3 with connected brake circuits, a nominal characteristic field 31 for the relationship between pressure $P_{DBE}$ and piston position $S_{DBE}$ of the pressure generating device 3 is stored in the control and regulating unit 5. Characteristic field 31 takes into account the permissible tolerances, e.g. the possible series variance of the P-V characteristic (pressure-volume take-up characteristic) of the wheel brakes 6, the dispersion of the pad stiffness etc. In Block 30 the measured values for the pressure $P_{DBE}$ and piston position $S_{DBE}$ are compared with the specified characteristic field 31. If the plausibility-checked measurement values (the measurement value pair ($S_{DBE}$, $P_{DBE}$)) lie within the permissible range of the stored characteristic field 31 (between the dashed curves in Block 30), then the pressure generating device 3 is in the nominal permissible range and is mechanically and hydraulically in order. In the event of a leak in the brake system the pressure $P_{DBE}$ would drop steadily, e.g. for constant piston position $S_{DBE}$, so that in comparison with the characteristic field 31 the measurement value pair would fall below the lower (dashed) curve of the permissible range. A leak can then be detected from this. For example, in the event of air ingress into the brake system the measurement value pair repeatedly lies below the lower (dashed) curve of the permissible range.

Moreover, for monitoring the functional state of the actuation device 2 (e.g. for leaks, air ingress or spring breakage of the simulation device spring 30), a nominal characteristic field 29 for the relationship between pressure $P_{Ped}$ and position $S_{Ped}$ of the pressure generating device 2 is stored in the control and regulating unit 5. Characteristic field 29 is mainly determined by the simulation device spring 30 and its permissible series tolerance. Furthermore, in characteristic field 29 a permissible frictional pressure caused by means of sealing collars and the measurement uncertainty of the sensors 7, 8 can also be taken into account if appropriate. In Block 28 the measured values of pressure $P_{Ped}$ and position $S_{Ped}$ are compared with the specified characteristic field 29. If the plausibility-checked measurement values of the sensors 7, 8 lie within the permissible area of the stored characteristic field 29 (between the dashed curves in Block 28), then the actuation device 2 is in the nominal permissible range and is mechanically and hydraulically in order.

Plausibility-checked measurement values for the measurement variables $S_{Pedal}$ and $P_{pedal}$ of sensors 7 and 8 are very important for a functional check of the actuation device 2, but also for safe and reliable detection of the braking demand of the driver 22.

The plausibility-checked measurement values $S_{pedal}$, $P_{Pedal}$ of displacement and pressure sensors 7, 8 are used in Block 23 for determining a target value $P_{soll}$ for the desired brake force boost. The corresponding pressure 26 in the wheel brakes 6 is set by means of an engine controller 25 integrated in the control and regulating unit 5 according to the example by means of suitable control 27 of the motor 47 of the pressure generating device 3.

In the event of the occurrence of a single defect in one of the sensors 7 or 8, (i.e. the displacement or pressure sensor signals itself as a reliable signal supplier) the detection of the driver's demand according to the example is changed over to purely displacement information (sensor 7) or pressure information (sensor 8), depending on which sensor is still supplying plausibility-checked measurement values. Here the brake force boost can continue to be maintained in the event of a single defect. If the optional integrated brake light switch 14 is included in the plausibility checking design, then the isolating valves 39 can continue to be controlled if the displacement sensor 7 fails.

As described in detail above, the plausibility-checked measurement values $S_{pedal}$, $P_{Pedal}$ are used for functional checking (plausibility check) of the actuation unit 2 (mechanical, hydraulic) by means of Block 28.

According to the invention, in each of the two blocks 28 or 30 for the corresponding subsystem (actuation device 2 including simulation device 40 or pressure generating device 3 with brake circuits) an actual system stiffness CI or C2 is calculated for an individual system from the corresponding actual measurement value pairs ($S_{Pedal}$, $P_{Pedal}$) or ($S_{DBE}$, $P_{DBE}$). The actual system stiffness CI or C2 of an individual system is simply obtained e.g. from successive measurement value pairs as the (numeric) derivative of one measurement variable with respect to the other measurement variable (differential quotient), e.g. $\Delta P_{Pedal}/\Delta S_{pedal}$.

The states of the two subsystems, which are characterized by the system stiffnesses CI, C2 of the individual systems, are taken into account in an actual overall system stiffness C_Ges, e.g. by addition, in an overall system plausibility checking block 32. In the event of a fault in the brake system, a warning 33 can be carried out using an assessment of the remaining overall system stiffness C_Ges.

For example, a vehicle-specific lower limit $S_{c\_Ges}$ of the overall system stiffness can be defined, which should be complied with. The observance of a lower limit $S_{c\_Ges}$ of the overall system stiffness provides for the availability of the fallback level required in the event of system failure (both subsystems are connected to each other by the opening/closing of the isolating valves and the connecting valves 39, 45). If the overall system stiffness is below the provided lower limit $S_{c\_Ges}$ of the overall system stiffness, then an error message 33 is output to the vehicle via the vehicle interface 15 ("fallback level impaired").

Optionally, intervention into the vehicle management means can be carried out on detecting a poor bleeding state of the brake system (e.g. in the form of a speed limit, a request for a workshop visit, an entry in an error memory, subsequent starting of a bleeding routine).

Moreover, for example, error messages may be deposited in an error memory for the two subsystems on departing from their nominal characteristic fields 29, 31 according to a corresponding plausibility check.

It is an advantage of the invention to guarantee a maximum of functional availability of the brake system for the vehicle driver. By means of the method described above the brake system is monitored in its functionality and plausibility checked for possible functional faults.

While the above description constitutes the preferred embodiment of the present invention, it will be appreciated that the invention is susceptible to modification, variation and change without departing from the proper scope and fair meaning of the accompanying claims.

The invention claimed is:

1. A method for monitoring a brake system for motor vehicles, which can be controlled in a brake-by-wire operating mode both by a vehicle driver and also independently of the vehicle driver, comprising the steps of;
    providing a hydraulic actuation device operated by means of a brake pedal with a brake master cylinder, to which wheel brakes are connected through at least two brake circuits, and a simulation device having at least one elastic element,
    providing an electrically controllable pressure generating device, which is formed by a cylinder-piston assembly, having a piston which can be operated by an electromechanical actuation device, detecting a first measurement variable ($P_{DBE}$) characterizing the pressure of the pressure generating device,
    providing an electronic control and regulating unit, detecting a second measurement variable ($S_{DBE}$) characterizing a position or location of the piston, and for monitoring a functional state of the brake system the detected values of the first and the second measurement variable ($S_{DBE}$, $P_{DBE}$) are compared with a first specified characteristic field of the first and second measurement variables, wherein an actual system stiffness (C2) of the pressure generating device is determined from the values of the first and second measurement variables ($P_{DBE}$, $S_{DBE}$) as the derivative of the first measurement variable ($P_{DBE}$) with respect to the second measurement variable ($S_{DBE}$) or vice-versa.

2. The method as claimed in claim 1, further comprising in that a plausibility check of the values of the first and the second measurement variables ($P_{DBE}$, $S_{DBE}$) is carried out in each case, and that only plausibility-checked measurement values of the respective measurement variables ($P_{DBE}$, $S_{DBE}$) are used for comparison with the first specified characteristic field of the first and the second measurement variables.

3. The method according to claim 1 further comprising detecting a third measurement variable ($P_{Pedal}$) characterizing the pressure of the brake master cylinder, and detecting a fourth measurement variable ($S_{Pedal}$) characterizing an actuating travel of the brake pedal, wherein for monitoring the functional state of the brake system the detected values of the third and the fourth measurement variables ($P_{Pedal}$, $S_{Pedal}$) are compared with a second specified characteristic field of third and fourth measurement variables.

4. The method as claimed in claim 3, further comprising in that a plausibility check of the values of the third and fourth measurement variables ($P_{Pedal}$, $S_{Pedal}$) is carried out, and that only plausibility-checked measurement values of the respective measurement variables ($P_{Pedal}$, $S_{Pedal}$) are used for comparison with the second specified characteristic field of third and fourth measurement variables.

5. The method as claimed in claim 3 further comprising in that an actual system stiffness (CI) of the actuation device is determined from the values of the third and fourth measurement variables ($P_{pedal}$, $S_{Pedal}$) as the derivative of the third measurement variable ($P_{Pedal}$) with respect to the fourth measurement variable ($S_{Pedal}$) or vice-versa.

6. The method as claimed in claim 5, further comprising monitoring an overall stiffness (C_GES), which is determined from the actual system stiffnesses (CI, C2) of the actuation device and the pressure generating device.

7. The method as claimed in claim 6, further comprising outputting an error message is if the overall stiffness (C_GES) is less than a specified limit value ($S_{c\_Ges}$).

8. The method according to claim 1 further comprising in that outputting a subsystem-specific error message if the values of the first and second measurement variables do not lie within a permissible area of the first specified characteristic field of first and second measurement variables or if the values of the third and fourth measurement variables do not lie within a permissible area of the second specified characteristic field of third and fourth measurement variables.

9. A brake system for motor vehicles, which can be controlled in a brake-by-wire operating mode both by a vehicle driver and also independently of the vehicle driver, comprising;

a hydraulic actuation device operated by means of a brake pedal with a master brake cylinder, to which wheel brakes are connected through at least two brake circuits, and a simulation device, which comprises at least one elastic element, an electrically controllable pressure generating device, which is formed by a cylinder-piston assembly, whose piston is operated by means of an electromechanical actuation device, a first sensor device for detecting a first measurement variable ($P_{DBE}$) characterizing the pressure of the pressure generating device, and an electronic control and regulating unit, a second sensor device for detecting a second measurement variable ($S_{DBE}$) characterizing a position or location of the piston of the pressure generating device, wherein the electronic control and regulating unit comprises a means for comparing the detected values of the first and the second measurement variables ($S_{DBE}$, $P_{DBE}$) with a first specified characteristic field of the first and the second measurement variables.

10. The brake system as claimed in claim 9, wherein the brake system further comprises a third sensor device for detecting a third measurement variable ($P_{Pedal}$) characterizing the pressure of the brake master cylinder, and a fourth sensor device for detecting a fourth measurement variable ($S_{Pedal}$) characterizing an actuating travel of the brake pedal, wherein the electronic control and regulating unit comprises a means of comparing the detected values of the third and the fourth measurement variables ($P_{Pedal}$, $S_{Pedal}$) with a second specified characteristic field of the third and the fourth measurement variables.

11. The brake system as claimed in claim 10 further comprising in that at least one of the second, the third, and the fourth sensor devices, is implemented in redundant form.

12. The brake system according to claim 9 further comprising in that in the electronic control and regulating unit means are provided so that only plausibility checked or reliable values of the corresponding first and second measurement variables ($P_{DBE}$, $S_{DBE}$, $P_{Pedal}$, $S_{Pedal}$) are used for comparison with at least one of the first or second characteristic fields.

13. The brake system according to claim 12 further comprising wherein that the electronic control and regulating unit further is configured for monitoring the brake system.

* * * * *